United States Patent
Moehring

(10) Patent No.: US 12,544,044 B2
(45) Date of Patent: Feb. 10, 2026

(54) METHODS AND SYSTEMS FOR CMUT RESONANCE DETERMINATION

(71) Applicant: OtoNexus Medical Technologies, Inc., Bellevue, WA (US)

(72) Inventor: Mark A. Moehring, Seattle, WA (US)

(73) Assignee: OtoNexus Medical Technologies, Inc., Bellevue, WA (US)

( * ) Notice: Subject to any disclaimer, the term of this patent is extended or adjusted under 35 U.S.C. 154(b) by 0 days.

(21) Appl. No.: 18/527,009

(22) Filed: Dec. 1, 2023

(65) Prior Publication Data

US 2024/0090877 A1 Mar. 21, 2024

Related U.S. Application Data

(63) Continuation of application No. PCT/US2022/035305, filed on Jun. 28, 2022.

(60) Provisional application No. 63/216,094, filed on Jun. 29, 2021.

(51) Int. Cl.
*A61B 8/00* (2006.01)
*A61B 8/12* (2006.01)

(52) U.S. Cl.
CPC ............. *A61B 8/58* (2013.01); *A61B 8/12* (2013.01); *A61B 8/488* (2013.01)

(58) Field of Classification Search
CPC .......... A61B 8/58; A61B 8/488; A61B 8/4483
See application file for complete search history.

(56) References Cited

U.S. PATENT DOCUMENTS

| | | | |
|---|---|---|---|
| 6,173,613 B1 * | 1/2001 | Dunegan | G01N 29/14 73/602 |
| 6,775,388 B1 | 8/2004 | Pompei | |
| 7,545,075 B2 | 6/2009 | Huang et al. | |
| 8,079,263 B2 | 12/2011 | Randall et al. | |
| 8,531,919 B2 | 9/2013 | Cheng et al. | |
| 9,925,561 B2 | 3/2018 | Emadi et al. | |
| 10,660,604 B2 | 5/2020 | Moehring et al. | |
| 10,675,001 B2 | 6/2020 | Moehring et al. | |
| 10,845,479 B1 * | 11/2020 | Hodges | G01S 15/526 |
| 11,850,091 B2 | 12/2023 | Moehring et al. | |
| 2007/0129632 A1 | 6/2007 | Voie et al. | |
| 2008/0242997 A1 * | 10/2008 | Lynch | G01N 29/4445 600/455 |

(Continued)

FOREIGN PATENT DOCUMENTS

| | | |
|---|---|---|
| WO | WO-2021/041739 | 3/2021 |
| WO | WO-2023278437 | 1/2023 |

OTHER PUBLICATIONS

Co-pending U.S. Appl. No. 18/510,300, inventor Moehring; Mark A., filed Nov. 15, 2023.
EP20856609.1 Extended European Search Report dated Aug. 17, 2023.
Mcintosh et al. Modelling of the radiated field from multi-element capacitive micromachined ultrasonic transducers. Ultrasonics 42 (2004) 447-452.

(Continued)

*Primary Examiner* — Rochelle D Turchen
(74) *Attorney, Agent, or Firm* — Wilson Sonsini Goodrich & Rosati

(57) ABSTRACT

A method of determining a resonance frequency of a capacitive micromachined ultrasound transducer may include directing a broadband excitation waveform at an ultrasound transducer, wherein the excitation waveform comprises a frequency band which includes an anticipated resonance frequency of the ultrasound transducer; and measuring a ringdown characteristic of the ultrasound transducer.

22 Claims, 7 Drawing Sheets

604 ⟶

600
Direct a broadband electrical stimulus waveform at an ultrasound transducer, where the spectral bandwidth of the stimulus waveform includes an anticipated resonance frequency range of the ultrasound transducer

↓

602
Measure a ringdown characteristic of the ultrasound transducer from at least one emitted signal of the ultrasound transducer as a result of the broadband electrical stimulus

(56) References Cited

U.S. PATENT DOCUMENTS

| | | | |
|---|---|---|---|
| 2008/0259725 A1 | 10/2008 | Bayram et al. | |
| 2010/0173437 A1 | 7/2010 | Wygant et al. | |
| 2012/0068571 A1 | 3/2012 | Chen | |
| 2014/0039293 A1 | 2/2014 | Oraevsky et al. | |
| 2014/0265720 A1 | 9/2014 | El-Gamal et al. | |
| 2015/0061923 A1* | 3/2015 | Sato | G01S 13/4454 |
| | | | 342/149 |
| 2017/0232474 A1 | 8/2017 | Oralkan et al. | |
| 2017/0289722 A1 | 10/2017 | Ochiai et al. | |
| 2018/0071775 A1 | 3/2018 | Zhuang et al. | |
| 2020/0107813 A1 | 4/2020 | Moehring et al. | |
| 2021/0346725 A1* | 11/2021 | Rousso | A61B 8/085 |

OTHER PUBLICATIONS

PCT/US2022/035305 International Search Report and Written Opinion dated Oct. 5, 2022.

PCT/US20/48288 International Search Report & Written Opinion dated Jan. 19, 2021.

Tawfik et al. Reduced-gap CMUT implementation in PolyMUMPs for air-coupled and underwater applications. Sensors and Actuators A: Physical: 294 (2019): 102-115.

U.S. Appl. No. 17/004,568 Notice of Allowance dated Aug. 22, 2023.

U.S. Appl. No. 17/004,568 Notice of Allowance dated Sep. 8, 2023.

\* cited by examiner

— Ping excitation   ······· Ringdown

— Broad ping   ······· Ringdown

604 ↘

600
Direct a broadband electrical stimulus waveform at an ultrasound transducer, where the spectral bandwidth of the stimulus waveform includes an anticipated resonance frequency range of the ultrasound transducer

602
Measure a ringdown characteristic of the ultrasound transducer from at least one emitted signal of the ultrasound transducer as a result of the broadband electrical stimulus

700
Receive a plurality of Fourier transform data points of an emitted electrical signal of an ultrasound transducer after the ultrasound transducer was provided a broadband electrical stimulus

702
Determine a polynomial fit of the plurality of data points surrounding a peak frequency of the plurality of Fourier transform data points

704
Determine the peak frequency of the ultrasound transducer from a maximum of the polynomial fit of the plurality of data points surrounding the peak frequency

FIG. 7

METHODS AND SYSTEMS FOR CMUT RESONANCE DETERMINATION

CROSS-REFERENCE

This application is a continuation of PCT Application No. PCT/US22/35305, filed Jun. 28, 2022, which claims benefit of U.S. Provisional Patent Application No. 63/216,094, filed Jun. 29, 2021, which is entirely incorporated by reference.

BACKGROUND

Pneumatic otoscopy is a medical examination that allows determination of the mobility of a tympanic membrane of a patient in response to pressure changes (e.g., airflow). A healthy tympanic membrane moves in response to pressure. Immobility may be due to fluid in the middle ear. Otitis media with effusion is characterized by the presence of fluid adjacent the tympanic membrane. Accordingly, establishing a diagnosis of otitis media with effusion may be aided by pneumatic otoscopy.

Pneumatic otoscopy generally comprises insertion of a speculum into the ear canal to create a pressure seal. The proximal end of the speculum tip is attached to a head comprising a lens, a light source, and a pressure source (e.g., a rubber bulb). The clinician gently squeezes and releases the bulb to induce movement in the tympanic membrane. The clinician then observes the presence or absence of membrane movement to infer the presence of fluid behind the membrane.

SUMMARY

Recognized herein is a need to improve capacitive micromachined ultrasound transducer (CMUT) systems, methods, and devices. For example, it may be advantageous to determine a resonance frequency of the CMUT. Driving the CMUT at the resonance frequency may improve the sensitivity of the CMUT in ultrasound otoscopy measurements.

In an aspect, the present disclosure provides a method of determining a resonance frequency of a capacitive micromachined ultrasound transducer. The method may comprise: directing a broadband electrical stimulus waveform at an ultrasound transducer, wherein the waveform comprises a frequency band which includes an anticipated center frequency of the ultrasound transducer; and measuring a ringdown characteristic of the ultrasound transducer.

In some embodiments, the ultrasound transducer is coupled to a speculum of an otoscope.

In some embodiments, the ultrasound transducer is coupled to a stethoscope bell for performing auscultation of internal organs and blood vessels.

In another aspect, the present disclosure provides a system for performing the method of any aspect or embodiment.

Another aspect of the present disclosure provides a system comprising one or more computer processors and computer memory coupled thereto. The computer memory comprises machine executable code that, upon execution by the one or more computer processors, implements any of the methods above or elsewhere herein.

In an aspect, the present disclosure provides a method of determining a resonance frequency of a capacitive micromachined ultrasound transducer, comprising: directing a broadband electrical stimulus waveform at an ultrasound transducer, wherein a spectral bandwidth of the stimulus waveform comprises an anticipated resonance frequency range of the ultrasound transducer; and measuring a ringdown characteristic of the ultrasound transducer from at least one emitted signal of the ultrasound transducer as a result of the broadband electrical stimulus. In some embodiments, the ultrasound transducer is coupled to a speculum of an otoscope. In some embodiments, the ultrasound transducer is coupled to a fixture for accomplishing auscultation of internal organs or blood vessels. In some embodiments, the ringdown characteristic of the ultrasound transducer is measured by a Doppler receiver configured to amplify the at least one emitted signal of the ultrasound transducer in response to the broadband electrical stimulation. In some embodiments, measuring the ringdown characteristic of the ultrasound transducer comprises calculating a Fourier transform of the amplified at least one emitted signal from the ultrasound transducer in response to the broadband electrical stimulus. In some embodiments, the Fourier transform comprises a zero-padded Fourier transform. In some embodiments, the Fourier transform incorporates a Hanning or Blackman filter window. In some embodiments, the ringdown characteristic comprises a resonance frequency.

In some embodiments, the method further comprises determining a peak frequency, where the peak frequency corresponds to a frequency of a maximum amplitude of the Fourier transform of the emitted signal. In some embodiments, the method further comprises determining a peak frequency of a plurality of data points of the Fourier transform, wherein determining the peak frequency comprises: receiving a plurality of Fourier transform data points of the emitted signal of the ultrasound transducer; determining a polynomial fit of a plurality of data points surrounding the peak frequency of the plurality of Fourier transform data points; and determining the peak frequency from a maximum of the polynomial fit of the plurality of data points surrounding the peak frequency. In some embodiments, the polynomial fit comprises a first, second, third, fourth, or fifth order polynomial fit. In some embodiments, the broadband electrical stimulation comprises a pulsed, signal. In some embodiments, the pulsed signal comprises one or more oscillations. In some cases, the one or more oscillations may comprise a uni-polar signal or a bi-polar signal. In some embodiments, the pulsed signal comprises a delta function. In some embodiments, the pulsed oscillating signal comprises at least 1 cycle of oscillation. In some embodiments, the oscillating signal comprises a cycle duration, wherein the cycle duration of the oscillating signal is configured to cover an anticipated range of resonance frequencies of the ringdown characteristic. In some embodiments, the pulsed signal comprises at least one pulse. In some embodiments, the plurality of data points surrounding the peak frequency of the plurality of Fourier transform data points may comprise up to 19 data points or at least 19 data point. In some embodiments, the ringdown characteristic is measured after the broadband electrical stimulation is directed at the ultrasound transducer. In some embodiments, at least two broadband electric stimuli are directed to the ultrasound transducer, and wherein at least two emitted signals of the ultrasound transducer are detected and averaged. In some embodiments, the ringdown characteristic comprises a resonance frequency, wherein the resonance frequency comprises about 1500 kilohertz (kHz) to about 2000 kHz. In some embodiments, the method further comprises characterizing the ultrasound transducer as functional or non-functional based on the ringdown characteristic. In some embodiments, the non-functional characterization of the ultrasound transducer comprises a ringdown characteristic outside a pre-determined range for the ringdown characteristic of the functional ultrasound transducer.

In an aspect, the present disclosure provides a computer system for determining a ringdown characteristic of an ultrasound transducer, comprising: an ultrasound transducer; a processor in electrical communication with the ultrasound transducer; and a non-transient computer readable storage medium including software, wherein the software comprises executable instructions that, as a result of execution, cause the processor of the computer system to: provide a broadband electrical stimulation to the ultrasound transducer, wherein a spectral bandwidth of the broadband electrical stimulation comprises an anticipated resonance frequency range of the ultrasound transducer; measure an emitted signal from the ultrasound transducer in response to the broadband electrical stimulation; and determine a ringdown characteristic of the emitted signal. In some embodiments, the ultrasound transducer comprises a capacitive micromachined ultrasound transducer. In some embodiments, the ultrasound transducer is coupled to a speculum of an otoscope. In some embodiments, the ultrasound transducer is coupled to a fixture for accomplishing auscultation of internal organs or blood vessels. In some embodiments, the ringdown characteristic of the ultrasound transducer is measured by a Doppler receiver configured to digitize and/or amplify an emitted signal of the ultrasound transducer in response to the broadband electrical stimulation. In some embodiments, the software executable instructions further comprise digitizing the amplified emitted signal of the ultrasound transducer. In some embodiments, determining the ringdown characteristic of the ultrasound transducer comprises calculating a Fourier transform of the digitized and/or amplified emitted signal of the ultrasound transducer in response to the broadband electrical stimulus. In some embodiments prior to calculating the Fourier transform, the emitted signal is zero-padded. In some embodiments, the Fourier transform incorporates a Hanning or Blackman filter window. In some embodiments, the ringdown characteristic comprises a resonance frequency. In some embodiments, the software executable instructions further comprise determining a peak frequency, where the peak frequency corresponds to a frequency of a maximum amplitude of the Fourier transform of the emitted signal.

In some embodiments, the software executable instructions further comprise determining a peak frequency of a plurality of data points of the Fourier transform, wherein determining a peak frequency comprises: receiving a plurality of Fourier transform data points of the emitted signal of the ultrasound transducer; determining a polynomial fit of a plurality of data points surrounding the peak frequency of the plurality of Fourier transform data points; and determining the peak frequency from a maximum of the polynomial fit of the plurality of data points surrounding the peak frequency. In some embodiments, the polynomial fit comprises a first, second, third, fourth, or fifth order polynomial fit. In some embodiments, the plurality of data points surrounding the peak frequency comprises up to 19 data points or at least 19 data points.

In some embodiments, the broadband electrical stimulation comprises a pulsed signal. In some embodiments, the pulsed signal comprises one or more oscillations. In some cases, the one or more oscillations may comprise a uni-polar signal or a bi-polar signal. In some embodiments, the pulsed signal comprises a delta function. In some embodiments, the oscillating signal comprises at least 1 cycle of oscillation. In some embodiments, the oscillating signal comprises a cycle duration, wherein the cycle duration of the oscillating signal is configured to cover an anticipated range of resonance frequencies of the ringdown characteristic. In some embodiments, the pulsed signal of the broadband electrical stimulation comprises at least one pulse. In some embodiments, the ringdown characteristic is measured after the broadband electrical stimulation is directed at the ultrasound transducer. In some embodiments, at least two broadband electric stimuli are directed to the ultrasound transducer, and wherein at least two emitted signals of the ultrasound transducer are averaged. In some embodiments, the ringdown characteristic comprises a resonance frequency, wherein the resonance frequency comprises about 1500 kilohertz (kHz) to about 2000 kHz. In some embodiments, the software executable instructions further comprise characterizing the ultrasound transducer as functional or non-functional based on the ringdown characteristic. In some embodiments, the non-functional characterization of the ultrasound transducer comprises a ringdown characteristic outside a predetermined range for the ringdown characteristic of the functional ultrasound transducer.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 6 shows a flow chart for a method of determining a ringdown characteristic of an ultrasound transducer, as described in some embodiments herein.

FIG. 7 shows a flow chart for a method of determining a peak frequency of a plurality of Fourier transform data points of an emitted signal, as described in some embodiments herein.

DETAILED DESCRIPTION

Figure 1A:
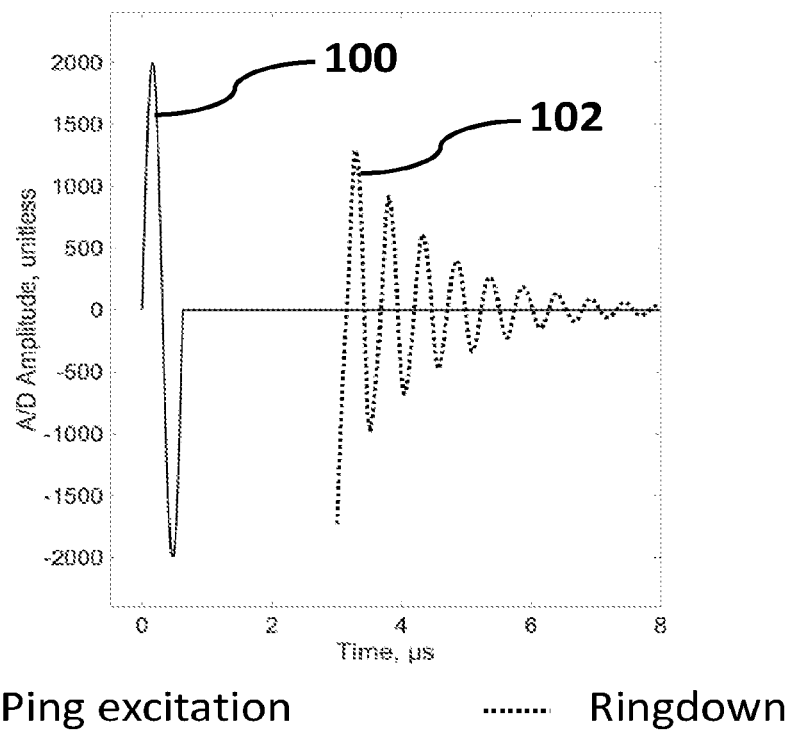
FIG. 1A is a graph showing an example time-domain measurement of a ringdown (dashed line) after a temporally narrow and spectrally broad ping (solid line).

Disclosed herein are improved systems, devices, and methods to determine a resonance frequency of an ultrasound transducer, and in particular a capacitive micromachined ultrasound transducer (CMUT), though such systems, devices, and methods may be applicable for other types of ultrasound transducers as well, such as piezoelectric transducers (PZT) or piezoelectric micromachined ultrasound transducers (PMUT). While it may be possible to determine a resonance frequency with a frequency sweep measurement (e.g., varying the frequency of the driving electrical signal stepwise) and measuring the real part of the vector impedance of the ultrasound response at each step, this method may present challenges in instrument complexity and manufacturability, for example, in the case of a handheld otoscope. Methods and systems of the present disclosure may, for example, utilize a narrow in time (broad in frequency) electrical ping and measure the generated transducer vibration rate (i.e., resonance frequency) over a small-time window (the "ringdown"). To determine a frequency spectrum, a Fourier transform of the ringdown may be performed to generate the frequency spectrum of the characteristic ultrasound transducer response. In the generated frequency spectrum, a peak in the spectrum may indicate a resonance frequency. This method may generate a full frequency spectrum with a single time domain measurement; however, multiple measurements may be averaged to generate an average.

The in-situ determination of resonance may be advantageous over an electrical impedance test because a device which measures the electrical impedance may not be available in a clinical setting.

The system, devices, otoscopes, specula, and methods of use and manufacture thereof, as disclosed herein, may be used in combination with, for example, the capacitive micromachined ultrasound transducers and methods of characterization, manufacture, and use thereof as those described in commonly owned U.S. Patent Publication 2021/0145406, which is incorporated by reference in its entirety.

The system, devices, otoscopes, specula, and methods of use and manufacture thereof, as disclosed herein, may be used in combination with for example devices and methods to characterize a ductile membrane, surface, and sub-surface properties such as those described in commonly owned U.S. Patent Publication 2020/0107813, U.S. Patent Publication 2018/0310917, and U.S. Patent Publication 2017/0014053, each of which is incorporated by reference in their entireties.

The system, devices, otoscopes, specula, and methods of use and manufacture thereof, as disclosed herein, may be used to characterize a number of biological tissues to provide a variety of diagnostic information. A biological tissue may comprise a patient organ. A speculum may be disposed within a bodily cavity to characterize a patient tissue. A patient organ or bodily cavity may comprise for example: an ear canal and/or tympanic membrane, a muscle, a tendon, a ligament, a mouth, a tongue, a pharynx, an esophagus, a stomach, an intestine, an anus, a liver, a gallbladder, a pancreas, a nose, a larynx, a trachea, lungs, kidneys, a bladder, a urethra, a uterus, a vagina, an ovary, a testicle, a prostate, a heart, an artery, a vein, a spleen, a gland, a brain, a spinal cord, a nerve, a blood vessel such as an artery or a vein, etc, to name a few.

The system, devices, otoscopes, specula, and methods of use and manufacture thereof as disclosed herein may be used to characterize a tympanic membrane. For example, a membrane may be characterized to determine a condition of an ear, such as acute otitis media (AOM). A characterization that an ear exhibits AOM may include detection of the presence of effusion and characterization of the type of effusion as one of serous, mucoid, purulent, or combinations of these. In AOM, the middle ear effusion (MEE) may be induced by infective agents and may be thin or serous with viral infection and thicker and purulent with bacterial infection. Accordingly, determining various properties of a fluid adjacent a tympanic membrane may provide information which may be used to characterize a membrane.

Capacitive micromachined ultrasound transducers (CMUTs) may comprise a portion of a consumable speculum tip of an otoscope. However, in some cases, it may be difficult to characterize a CMUT as functional. In an example, a type of non-functionality is a potential decrease in signal-to-noise ratio (SNR). A decrease in SNR may be due to the double loss of (1) driving the CMUT at a frequency other than resonance and (2) observing ultrasound echoes at an incoming frequency not matching the CMUT resonance.

As another potential difficulty, a single CMUT may exhibit different resonances due to different altitudes. For example, a transducer operated in Seattle which has a resonance at 1.85 MHz may have a resonance of 1.77 MHz in Denver. By way of explanation, a resonance change may be 4 kHz/kPa, where a pressure may be 0.8 Atm in Denver which may be a 20% pressure drop relative to Seattle (sea level).

These effects may be exacerbated by the directional orientation of the tympanic membrane (TM) surface. For example, echoes from some ears may be weak, due to for example the directional orientation of the tympanic membrane surface with respect to the ultrasound transducer. In some cases, it may be advantageous to operate the transducer on resonance, which may be the transducer's point of greatest sensitivity. Determining a resonance of the transducer may be accomplished by detecting that frequency in situ.

In some cases, it may be advantageous to determine an ultrasound transducer's resonance frequency to control for manufacturing variations. In some cases, it may be advantageous to determine a resonance to control for altitude variations. With a measured value of the resonance, a driving waveform of the CMUT may be adapted such that the CMUT is driven at the resonance frequency prevailing at a given time of year, altitude, and allowed-for manufacturing process variability.

Disclosed herein are improved systems, devices, and methods to determine a resonance frequency of a CMUT. For example, one method of determining a resonance frequency is to "ping" (100), shown in FIG. 1A, the transducer and evaluate the frequency domain peak frequency 106 of its response 108, as shown in FIG. 1B. In some cases, the ping 100 should contain the a range of frequencies which contains the expected resonance of the ultrasound transducer.

The ping may be an electrical ping. This frequency range of the ping may be about 500 kHz to about 5 MHz, or a subrange thereof. In some cases, the frequency range of the ping may be about 0.5 Mega Hertz (MHz) to about 5 MHz. In some cases, the frequency range of the ping may be about 0.5 MHz to about 0.6 MHz, about 0.5 MHz to about 0.7 MHz, about 0.5 MHz to about 0.8 MHz, about 0.5 MHz to about 0.9 MHz, about 0.5 MHz to about 1 MHz, about 0.5 MHz to about 2 MHz, about 0.5 MHz to about 3 MHz, about 0.5 MHz to about 4 MHz, about 0.5 MHz to about 5 MHz, about 0.6 MHz to about 0.7 MHz, about 0.6 MHz to about 0.8 MHz, about 0.6 MHz to about 0.9 MHz, about 0.6 MHz to about 1 MHz, about 0.6 MHz to about 2 MHz, about 0.6 MHz to about 3 MHz, about 0.6 MHz to about 4 MHz, about 0.6 MHz to about 5 MHz, about 0.7 MHz to about 0.8 MHz, about 0.7 MHz to about 0.9 MHz, about 0.7 MHz to about 1 MHz, about 0.7 MHz to about 2 MHz, about 0.7 MHz to about 3 MHz, about 0.7 MHz to about 4 MHz, about 0.7 MHz to about 5 MHz, about 0.8 MHz to about 0.9 MHz, about 0.8 MHz to about 1 MHz, about 0.8 MHz to about 2 MHz, about 0.8 MHz to about 3 MHz, about 0.8 MHz to about 4 MHz, about 0.8 MHz to about 5 MHz, about 0.9 MHz to about 1 MHz, about 0.9 MHz to about 2 MHz, about 0.9 MHz to about 3 MHz, about 0.9 MHz to about 4 MHz, about 0.9 MHz to about 5 MHz, about 1 MHz to about 2 MHz, about 1 MHz to about 3 MHz, about 1 MHz to about 4 MHz, about 1 MHz to about 5 MHz, about 2 MHz to about 3 MHz, about 2 MHz to about 4 MHz, about 2 MHz to about 5 MHz, about 3 MHz to about 4 MHz, about 3 MHz to about 5 MHz, or about 4 MHz to about 5 MHz. In some cases, the frequency range of the ping may be about 0.5 MHz, about 0.6 MHz, about 0.7 MHz, about 0.8 MHz, about 0.9 MHz, about 1 MHz, about 2 MHz, about 3 MHz, about 4 MHz, or about 5 MHz. In some cases, the frequency range of the ping may be at least about 0.5 MHz, about 0.6 MHz, about 0.7 MHz, about 0.8 MHz, about 0.9 MHz, about 1 MHz, about 2 MHz, about 3 MHz, or about 4 MHz. In some cases, the frequency range of the ping may be at most about 0.6 MHz, about 0.7 MHz, about 0.8 MHz, about 0.9 MHz, about 1 MHz, about 2 MHz, about 3 MHz, about 4 MHz, or about 5 MHz.

The anticipated transducer resonance frequency range may be about 1.6 to 2.0 MHz in some examples. A bandwidth which contains the expected resonance may be generated by driving the transducer at or near a resonance frequency, but with just a few cycles.

An example way to determine this bandwidth is to calculate $A=2/(nT)=2f/n$, where n is the number of cycles, T is the cycle period (i.e., cycle duration, described elsewhere herein), and $f=1/T$ is the frequency. Using this formula, the resulting band width using 1.8 MHz as the "model" frequency may be 0.6 MHz surrounding the carrier, if 6 cycles are employed. In some cases, reducing the number of cycles may have two effects. First, it may increase the ping bandwidth, and second, it may decrease the energy of the instigated resonance vibration. 1 cycle, for example, will spread the frequencies over a >3 MHz bandwidth, meaning [0.3-3.3] MHz, whereas 6 cycles will spread a higher amplitude vibration energy across the range [1.5-2.1] MHz. The lower energy in the 1 cycle case may make the signal arriving at the analog to digital converter and/or amplifier more advantageous because this signal may not saturate the Doppler receiver as much, or as long, as a larger number of carrier cycles. An example broadband ping signal 100 and corresponding Fourier frequency space 104 may be seen in FIG. 1B.

The Doppler receiver may capture the emitted signal 102, as a result of providing the ping, via normal digitization and amplification, which in this case may not be an RF echo but rather a "ringdown" within the time interval after the transmitter has sent out its ping. The Doppler receiver may adjust its gain dynamically and/or in real time.

The signal emitted from the ultrasound transducer 102 in response to the broadband electrical stimulation 100 may then be converted to a frequency domain signal 108, shown in FIG. 1B, by fast Fourier transform (FFT). The peak 106 (highest amplitude) frequency of the FFT may be the immediate resonance frequency of the transducer. In some cases, the digitally captured or digitized emitted signal (captured and/or digitized by the analog to digital converter, e.g., the Doppler receiver, described elsewhere herein) of the ultrasound transducer in response to the broadband electrical stimulation 102 may be digitally padded with at least one zero to improve the spectral or frequency resolution of the Fourier transform of the digitized emitted signal. In some cases, up to 20,000 zeros or at least 20,000 zeros may be utilized when padding the emitted signal of the ultrasound transducer prior calculating the Fourier transform.

As a result of determining the resonance frequency of the ultrasound transducer, the system, described elsewhere herein, may instruct a transmitter to output the determined resonance frequency. The system tunning the transmitter output to the determined resonance frequency may produce an improved otoscopy measurement.

Methods

The present disclosure provides methods to determine a ringdown characteristic of an ultrasound transducer. In some cases, the ultrasound transducer may comprise a CMUT. In some instances, the ringdown characteristic may comprise a peak and/or resonance frequency of the ultrasound transducer. As described elsewhere herein, the methods provided by the disclosure may determine the resonance frequency of the ultrasound transducer to provide optimal working conditions of the transducer, as described elsewhere herein.

In some cases, the methods may comprise a method of determining a resonance frequency of a capacitive micromachined ultrasound transducer 604, as seen in FIG. 6. In some cases, the method may comprise: directing a broadband electrical stimulus waveform at an ultrasound transducer, where the spectral bandwidth of the stimulus waveform may comprise an anticipated resonance frequency range of the ultrasound transducer 600; and measuring a ringdown characteristic of the ultrasound transducer from at least one emitted signal of the ultrasound transducer as a result of the broadband electrical stimulus 602. In some cases, the ultrasound transducer may be coupled to a fixture for accomplishing auscultation of internal organs or blood vessels. In some instances, the ringdown characteristic of the ultrasound transducer may be measured by a Doppler receiver configured to amplify the at least one emitted signal of the ultrasound transducer in response to the broadband electrical stimulation. In some cases, the method may further comprise digitizing the emitted signal of the ultrasound transducer. In some instances, digitizing the emitted signal of the ultrasound transducer may be conducted by an analog to digital converter. In some cases, the analog to digital converter may comprise a Doppler receiver. In some instances, measuring the ringdown characteristic of the ultrasound transducer may comprise calculating a Fourier transform of the amplified and/or digitized emitted signal of the ultrasound transducer in response to the broadband electrical stimulus. In some cases, the Fourier transform may comprise a Hanning or Blackman filter window. In some instances, the ringdown characteristic may comprise a resonance frequency of the ultrasound transducer. In some instances, the method may further comprise determining a peak frequency, where the peak frequency corresponds to a frequency of a maximum amplitude of the Fourier transform of the digitized emitted signal. In some cases, the ringdown characteristic comprises a resonance frequency, where the resonance frequency comprises about 1,500 kHz to about 2,000 kHz.

In some cases, the method may further comprise determining a peak frequency of a plurality of data points of the Fourier transform 706, as seen in FIG. 7. In some cases, determining the peak frequency may comprise: receiving a plurality of Fourier transform data points of an emitted signal of an ultrasound transducer after the ultrasound transducer was provided a broadband electrical stimulus 700; determining a polynomial fit of the plurality of data points surrounding a peak frequency of the plurality of Fourier transform data points 702; and determining the peak frequency of the ultrasound transducer from a maximum of the polynomial fit of the plurality of data points surrounding the peak frequency 704. In some cases, the polynomial fit may comprise a first, second, third, fourth, or fifth order polynomial fit. In some cases, the plurality of data points surrounding the peak frequency of the plurality of Fourier transform data points may comprise up to 19 data points or at least 19 data points.

In some instances, the broadband electrical stimulation may comprise a pulsed signal where the pulsed signal may comprise at least one or a plurality of pulses. In some cases, the pulsed signal may comprise one or more oscillation (e.g., a full wave oscillation, a half wave oscillation, etc.). In some cases, the pulsed oscillating signal may comprise a sinusoidal, square, sawtooth, triangle, or any combination thereof wave shape. In some cases, the one or more oscillations may comprise a uni-polar signal (e.g., delta function) or a bi-polar signal (e.g., sinusoid). In some cases, the pulsed signal may comprise a delta function. In some cases, the pulsed oscillating signal may comprise at least 1 cycle of oscillation. In some instances, the oscillating signal may comprise a cycle duration (i.e., the duration of time where the oscillating waveform amplitude completes a single cycle of oscillation), where the cycle duration of the oscillating signal is configured to cover an anticipated range of resonance frequencies of a ringdown characteristic (e.g., a resonance frequency of an ultrasound transducer). For example, the range of resonance frequencies may be adjusted by shortening the cycle duration to excite a broader range of potential resonance frequencies across a population of ultrasound transducers or lengthening the cycle duration to excite a narrower range of potential resonance frequencies across a population of ultrasound transducers. In some cases, utilizing a plurality of cycle oscillations for a given pulse may narrow the range of excited resonance frequencies anticipated across a population of ultrasound transducers compared to a single cycle oscillation that may excite a broader range of resonance frequencies anticipated across a population of ultrasound transducers.

In some cases, the ringdown characteristic may be measured after the broadband electrical stimulation is directed at the ultrasound transducer. In some cases, a detection or listening period of time of up to about 200 microseconds (µs) or at least 200 µs may be utilized after providing the broadband electrical stimulation. In some instances, at least two broadband electric stimuli are directed to the ultrasound transducer, and at least two emitted signals from the ultrasound transducer are detected. In some cases, the at least two emitted signals from the ultrasound transducer are averaged.

In some cases, the method may further comprise characterizing the ultrasound transducer as functional or non-functional based on the ringdown characteristic. In some instances, the non-functional characterization of the ultrasound transducer may comprise a ringdown characteristic outside a predetermined range for the ringdown characteristic of the functional ultrasound transducer. In some instances, the predetermine range for the ringdown characteristic of the functional ultrasound transducer may comprise a range of resonance frequencies. In some cases, the predetermine range for the ringdown characteristic may be determined a priori.

Computer Systems

Figure 5:
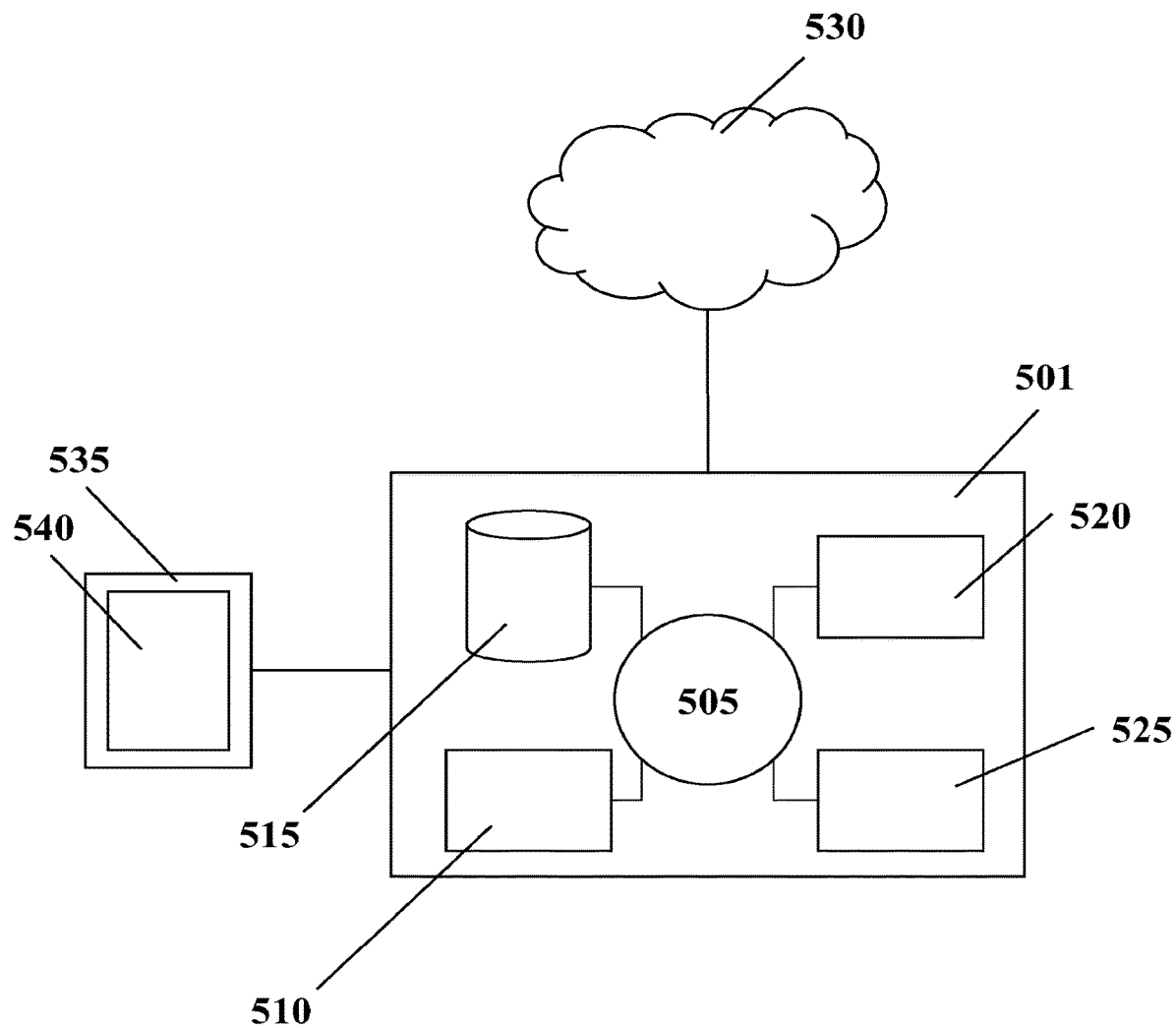
FIG. 5 shows a computer system that is programmed or otherwise configured to implement methods provided herein.

The present disclosure provides computer systems that are programmed to implement methods of the disclosure. FIG. 5 shows a computer system 501 that is programmed or otherwise configured to implement methods of determine a CMUT resonance a disclosed herein. The computer system 501 can regulate various aspects of devices of the present disclosure, such as, for example, computing a fast Fourier transform (FFT), directing the transducer electronics to operate the transducer at the appropriate resonance frequency, etc. The computer system 501 can be an electronic device of a user or a computer system that is remotely located with respect to the electronic device. The electronic device can be a mobile electronic device.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries, and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet 530.

The computer system 501 can communicate with one or more remote computer systems through the network 530. For instance, the computer system 501 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine-readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, a CMUT resonance frequency. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, determine a CMUT resonance frequency.

In some cases, the systems provided by the disclosure herein may comprise a computer system for determining a ringdown characteristic of an ultrasound transducer. In some instances, the computer system may comprise: (a) an ultrasound transducer; (b) a processor in electrical communication with the ultrasound transducer; and (c) non-transient computer readable storage medium including software, where the software comprises executable instructions that, as a result of execution cause the processor of the computer system to: (i) provide a broadband electrical stimulation to the ultrasound transducer, where a spectral bandwidth of the broadband electrical stimulation comprise an anticipated resonance frequency range of the ultrasound transducer; (ii) measure an emitted signal from the ultrasound transducer in response to the broadband electrical stimulation; and (iii) determine a ringdown characteristic of the emitted signal. In some cases, the ultrasound transducer may comprise a CMUT. In some instances, the ultrasound transducer may be coupled to a speculum of an otoscope. In some cases, the ultrasound transducer may be coupled to a fixture for accomplishing auscultation of internal organs or blood vessels. In some cases, the ringdown characteristic of the ultrasound transducer may be measured by a Doppler receiver configured to amplify an emitted signal of the ultrasound transducer in response to the broadband electrical stimulation. In some instances, the software may further cause the processor to digitize the amplified emitted signal of the ultrasound transducer. In some cases, determining the ringdown characteristic of the ultrasound transducer may comprise calculating a Fourier transform of the amplified emitted signal of the ultrasound transducer in response to the broadband electrical stimulus. In some cases, prior to calculating the Fourier transform, the emitted signal may be zero-padded. In some cases, the emitted signal may be zero-padded with up to 20,000 zeros or at least 20,000 zeros. In some instances, the Fourier transform may comprise a Hanning or Blackman filter window. In some cases, the ringdown characteristic may comprise a resonance frequency. In some instances, the software may further cause the processor to determine a peak frequency, where the peak frequency comprises a maximum amplitude of the Fourier transform of the emitted signal of the ultrasound transducer.

In some instances, the software may further cause the processor to determine a peak frequency of a plurality of data points of the Fourier transform. In some cases, determining the peak frequency of a plurality of data points of the Fourier transform may comprise: (a) receiving a plurality of Fourier transform data points of the emitted signal of the ultrasound transducer; (b) determining a polynomial fit of a plurality of data points surround the peak frequency of the plurality of Fourier transform data points; and determining the peak frequency from a maximum of the polynomial fit of the plurality of data points surrounding the peak frequency. In some cases, the polynomial fit may comprise a first, second, third, fourth, or fifth order polynomial fit. In some instances, the broadband electrical stimulation may comprise a pulsed signal. In some embodiments, the pulsed signal may comprise one or more oscillations. In some cases, the one or more oscillations may comprise a uni-polar signal or a bi-polar signal. In some instances, the pulsed signal may comprise a delta function. In some cases, the oscillating signal may comprise at least 1 cycle of oscillation. In some cases, the oscillating signal may comprise a cycle duration, where the cycle duration of the oscillating signal is configured to cover an anticipated range of resonance frequencies of the ringdown characteristic. In some instances, the pulsed signal of the broadband electrical stimulation may comprise at least one pulse. In some cases, the ringdown characteristic may be measured after the broadband electrical stimulation is provided to the ultrasound transducer. In some instances, at least two broadband electric stimuli may be directed to the ultrasound transducer thereby producing at least two emitted signals of the ultrasound transducer. In some cases, the at least two emitted signals of the ultrasound transducer may be averaged. In some instances, the ringdown characteristic may comprise a resonance frequency, where the resonance frequency may comprise about 1,500 kHz to about 2,000 kHz. In some cases, the plurality of data points surrounding the peak frequency may comprise up to 19 data points or at least 19 data points.

In some cases, the software may further cause the processor to characterize the ultrasound transducer as functional or non-functional based on the ringdown characteristic. In some instances, the non-functional characterization of the ultrasound transducer may comprise a ringdown characteristic outside a predetermined range for the ringdown characteristic of the functional ultrasound transducer. In some instances, the predetermine range for the ringdown characteristic of the functional ultrasound transducer may comprise a range of resonance frequencies.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Certain inventive embodiments herein contemplate numerical ranges. When ranges are present, the ranges include the range endpoints. Additionally, every sub range and value within the range is present as if explicitly written out.

The term "about" or "approximately" may mean within an acceptable error range for the particular value, which will depend in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where particular values are described in the application and claims, unless otherwise stated the term "about" meaning within an acceptable error range for the particular value may be assumed.

Embodiments

Numbered embodiment 1 comprises a method of determining a resonance frequency of an ultrasound transducer, comprising: directing a broadband electrical stimulus waveform at an ultrasound transducer, wherein the spectral bandwidth of the stimulus waveform includes an anticipated resonance frequency range of the ultrasound transducer; and measuring a ringdown characteristic of the ultrasound transducer from at least one emitted signal of the ultrasound transducer as a result of the broadband electrical stimulus. Numbered embodiment 2 comprises the method of embodiment 1, wherein the ultrasound transducer is coupled to a speculum of an otoscope. Numbered embodiment 3 comprises the method as in embodiments 1 or 2, wherein the ultrasound transducer is coupled to a fixture for accomplishing auscultation of internal organs or blood vessels. Numbered embodiment 4 comprises the method of any one of embodiments 1-3, wherein the ringdown characteristic of the ultrasound transducer is measured by a Doppler receiver configured to amplify the at least one emitted signal of the ultrasound transducer in response to the broadband electrical stimulation. Numbered embodiment 5 comprises the method of embodiment 4, further comprising digitizing the emitted signal of the ultrasound transducer. Numbered embodiment 6 comprises the method of any one of embodiments 1-5, wherein measuring the ringdown characteristic of the ultrasound transducer comprises calculating a Fourier transform of the amplified at least one emitted signal from the ultrasound transducer in response to the broadband electrical stimulus. Numbered embodiment 7 comprises the method of embodiment 6, wherein the Fourier transform comprises a zero-padded Fourier transform. Numbered embodiment 8 comprises the method as in embodiment 6 or 7, wherein the Fourier transform incorporates a Hanning or Blackman filter window. Numbered embodiment 9 comprises the method of any one of embodiments 1-8, wherein the ringdown characteristic comprises a resonance frequency. Numbered embodiment 10 comprises the method of any one of embodiments 6-9, wherein the method further comprises determining a peak frequency, where the peak frequency corresponds to a frequency of a maximum amplitude of the Fourier transform of the emitted signal. Numbered embodiment 11 comprises the method of embodiment 8, wherein the method further comprises determining a peak frequency of a plurality of data points of the Fourier transform, wherein determining a peak frequency comprises: receiving the plurality of Fourier transform data points of the emitted signal of the ultrasound transducer; determining a polynomial fit of the plurality of data points surrounding the peak frequency of the plurality of Fourier transform data points; and determining the peak frequency from a maximum of the polynomial fit of the plurality of data points surrounding the peak frequency. Numbered embodiment 12 comprises the method of embodiment 11, wherein the polynomial fit comprises a first, second, third, fourth, or fifth order polynomial fit. Numbered embodiment 13 comprises the method of any one of embodiments 1-12, wherein the broadband electrical stimulation comprises a pulsed signal, wherein the pulsed signal comprises one or more oscillations. Numbered embodiment 14 comprises the method of embodiment 13, wherein the pulsed signal comprises a delta function. Numbered embodiment 15 comprises the method of embodiment 13, wherein the oscillating signal comprises at least 1 cycle of oscillation. Numbered embodiment 16 comprises the method of any one of embodiments 13-15, wherein the pulsed oscillating signal comprises a cycle duration, wherein the cycle duration of the pulsed oscillating signal is configured to cover an anticipated range of resonance frequencies of the ringdown characteristic. Numbered embodiment 17 comprises the method of any one of embodiments 13-16, wherein the pulsed signal comprises at least one pulse. Numbered embodiment 18 comprises the method of any one of embodiments 11-17, wherein the plurality of data points surrounding the peak frequency of the plurality of Fourier transform data points may comprise up to 19 data points or at least 19 data point. Numbered embodiment 19 comprises the method of any one of embodiments 1-18, wherein, the ringdown characteristic is measured after the broadband electrical stimulation is directed at the ultrasound transducer. Numbered embodiment 20 comprises the method of any one of embodiments 1-19, wherein at least two broadband electric stimuli are directed to the ultrasound transducer, and wherein at least two emitted signals of the ultrasound transducer are averaged. Numbered embodiment 21 comprises the method of any one of embodiments 1-20, wherein the ringdown characteristic comprises a resonance frequency, wherein the resonance frequency comprises about 1500 kilohertz (kHz) to about 2000 kHz. Numbered embodiment 22 comprises the method of any one of embodiments 1-21, further comprises characterizing the ultrasound transducer as functional or non-functional based on the ringdown characteristic. Numbered embodiment 23 comprises the method of embodiment 22, wherein the non-functional characterization of the ultrasound transducer comprises a ringdown characteristic outside a predetermined range for the ringdown characteristic of the functional ultrasound transducer.

Numbered embodiment 24 comprises a computer system for determining a ringdown characteristic of an ultrasound transducer, comprising: an ultrasound transducer; a processor in electrical communication with the ultrasound transducer; and non-transient computer readable storage medium including software, wherein the software comprises executable instructions that, as a result of execution cause the processor of the computer system to: provide a broadband electrical stimulation to the ultrasound transducer, wherein a spectral bandwidth of the broadband electrical stimulation comprises an anticipated resonance frequency range of the ultrasound transducer; measure an emitted signal from the ultrasound transducer in response to the broadband electrical stimulation; and determine a ringdown characteristic of the emitted signal. Numbered embodiment 25 comprises the computer system of embodiment 24, wherein the ultrasound transducer comprises a capacitive micromachined ultrasound transducer. Numbered embodiment 26 comprises the computer system as in embodiment 24 or 25, wherein the ultrasound transducer is coupled to a speculum of an otoscope. Numbered embodiment 27 comprises the computer system of any one of embodiments 24-26, wherein the ultrasound transducer is coupled to a fixture for accomplishing auscultation of internal organs or blood vessels. Numbered embodiment 28 comprises the computer system of any one of embodiments 24-27, wherein the ringdown characteristic of the ultrasound transducer is measured by a Doppler receiver configured to amplify an emitted signal of the ultrasound transducer in response to the broadband electrical stimulation. Numbered embodiment 29 comprises the computer system of embodiment 28, wherein the software executable instructions further comprise digitizing the amplified emitted signal of the ultrasound transducer. Numbered embodiment 30 comprises the computer system as in embodiments 28 or 29, wherein determining the ringdown characteristic of the ultrasound transducer comprises calculating a Fourier transform of the amplified emitted signal of the ultrasound transducer in response to the broadband electrical stimulus. Numbered embodiment 31 comprises the computer system of embodiment 30, wherein prior to calculating the Fourier transform, the emitted signal is zero-padded. Numbered embodiment 32 comprises the computer system as in embodiments 30 or 31, wherein the Fourier transform incorporates a Hanning or Blackman filter window. Numbered embodiment 33 comprises the computer system of any one of embodiments 24-32, wherein the ringdown characteristic comprises a resonance frequency. Numbered embodiment 34 comprises the computer system of any one of embodiments 30-33, wherein the software executable instructions further comprise determining a peak frequency, where the peak frequency corresponds to a frequency of a maximum amplitude of the Fourier transform of the emitted signal. Numbered embodiment 35 comprises the computer system of embodiment 34, wherein the software executable instructions further comprise determining a peak frequency of a plurality of data points of the Fourier transform, wherein determining a peak frequency comprises: receiving the plurality of Fourier transform data points of the emitted signal of the ultrasound transducer; determining a polynomial fit of a plurality of data points surrounding the peak frequency of the plurality of Fourier transform data points; and determining the peak frequency from a maximum of the polynomial fit of the plurality of data points surrounding the peak frequency. Numbered embodiment 36 comprises the computer system of embodiment 35, wherein the polynomial fit comprises a first, second, third, fourth, or fifth order polynomial fit. Numbered embodiment 37 comprises the computer system of embodiment 35, wherein the plurality of data points surrounding the peak frequency comprises up to 19 data points or at least 19 data points.

Numbered embodiment 38 comprises the computer system of any one of embodiments 24-37, wherein the broadband electrical stimulation comprises a pulsed signal, wherein the pulsed signal comprises one or more oscillations. Numbered embodiment 39 comprises the computer system of embodiment 38, wherein the pulsed signal comprises a delta function. Numbered embodiment 40 comprises the computer system as in embodiment 38 or 39, wherein the pulsed oscillating signal comprises at least 1 cycle of oscillation. Numbered embodiment 41 comprises the computer system of any one of embodiments 38-40, wherein the pulsed oscillating signal comprises a cycle duration, wherein the cycle duration of the oscillating signal is configured to cover an anticipated range of resonance frequencies of the ringdown characteristic. Numbered embodiment 42 comprises the computer system of any one of embodiments 38-41, wherein the pulsed signal of the broadband electrical stimulation comprises at least one pulse. Numbered embodiment 43 comprises the computer system of any one of embodiments 24-42, wherein the ringdown characteristic is measured after the broadband electrical stimulation is directed at the ultrasound transducer. Numbered embodiment 44 comprises the computer system of any one of embodiments 24-43, wherein at least two broadband electric stimuli are directed to the ultrasound transducer, and wherein at least two emitted signals of the ultrasound transducer are averaged. Numbered embodiment 45 comprises the computer system of any one of embodiments 24-44, wherein the ringdown characteristic comprises a resonance frequency, wherein the resonance frequency comprises about 1500 kilohertz (kHz) to about 2000 kHz. Numbered embodiment 46 comprises the computer system of any one of embodiments 24-45, wherein the software executable instructions further comprise characterizing the ultrasound transducer as functional or non-functional based on the ringdown characteristic. Numbered embodiment 47 comprises the computer system of embodiment 46, wherein the non-functional characterization of the ultrasound transducer comprises a ringdown characteristic outside a predetermined range for the ringdown characteristic of the functional ultrasound transducer.

EXAMPLES

Example 1 Frequency Response Characterization of CMUT Transducers Under Varying Atmospheric Conditions By way of example, the following experiments were performed with the OtoNexus c0 Doppler system.

Equipment: OtoNexus Research Laboratory acoustic output monitoring system, with the system configured for pulse-echo mode and the transducer (resonance known a priori to be at 1.92 MHz).

Method: 1000 pulse periods were implemented and sampled using TX condition of 1 cycle burst length and selected frequency of 1.6 MHz. This frequency was chosen to demonstrate that this method of determining resonance does not require that the ping center frequency be near the transducer resonance frequency, but has energy the transducer "likes" because of the bandwidth associated with the lower duration pulse extends to include the resonance frequency of the transducer.

Figure 1B:
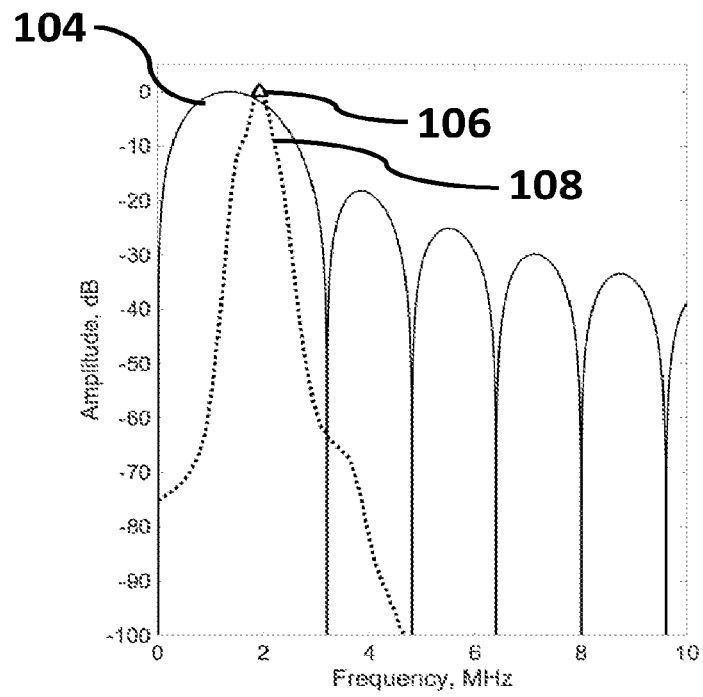
FIG. 1B is a graph showing the spectral (Fourier transform) domain of the solid and dashed signals, respectively, from FIG. 1A: an example measurement of a ringdown (dashed line) after a spectrally broad ping (solid line).

FIG. 1A shows, in the time domain, an example measurement of a ringdown (102) after a temporally narrow and spectrally broad ping (100).

FIG. 1B shows the spectral (Fourier transform) domain of the ringdown (108), and temporally narrow and spectrally broad ping (104).

The single cycle excitation is shown as a sinusoid in FIG. 1A, where the first several microseconds after the TX launch are displayed. The "ping" 100 shown has a frequency of 1.6 MHz. Trace 102 is the transducer ringdown period where sampling here begins at about 3 μs and lasts for about 5 μs, totaling about 125 samples at 25 MS/s. The trace 102 is the average of 1000 profiles on this system and took 0.2 seconds to acquire the data. The digitized mean ringdown 102 was padded with 20,000 zeros to increase spectral resolution on the Fourier transform.

The resulting frequency domain data are shown in FIG. 1B. The first lobe on the left edge of the waveform 104 shows the broad band nature of the "ping", which covers well the full range of resonance frequency we expect to see in a class of CMUT transducers.

The resulting frequency domain data of Fourier transform of the ringdown 108 indicate that the ping 100 may excite any CMUT in our class at its own resonance and elicit a response. This broadband excitation provided to the CMUT resulted in a determination of a peak frequency 106 at 1.92 MHz, which is the CMUT demonstrating its immediate resonance frequency.

Figure 2:
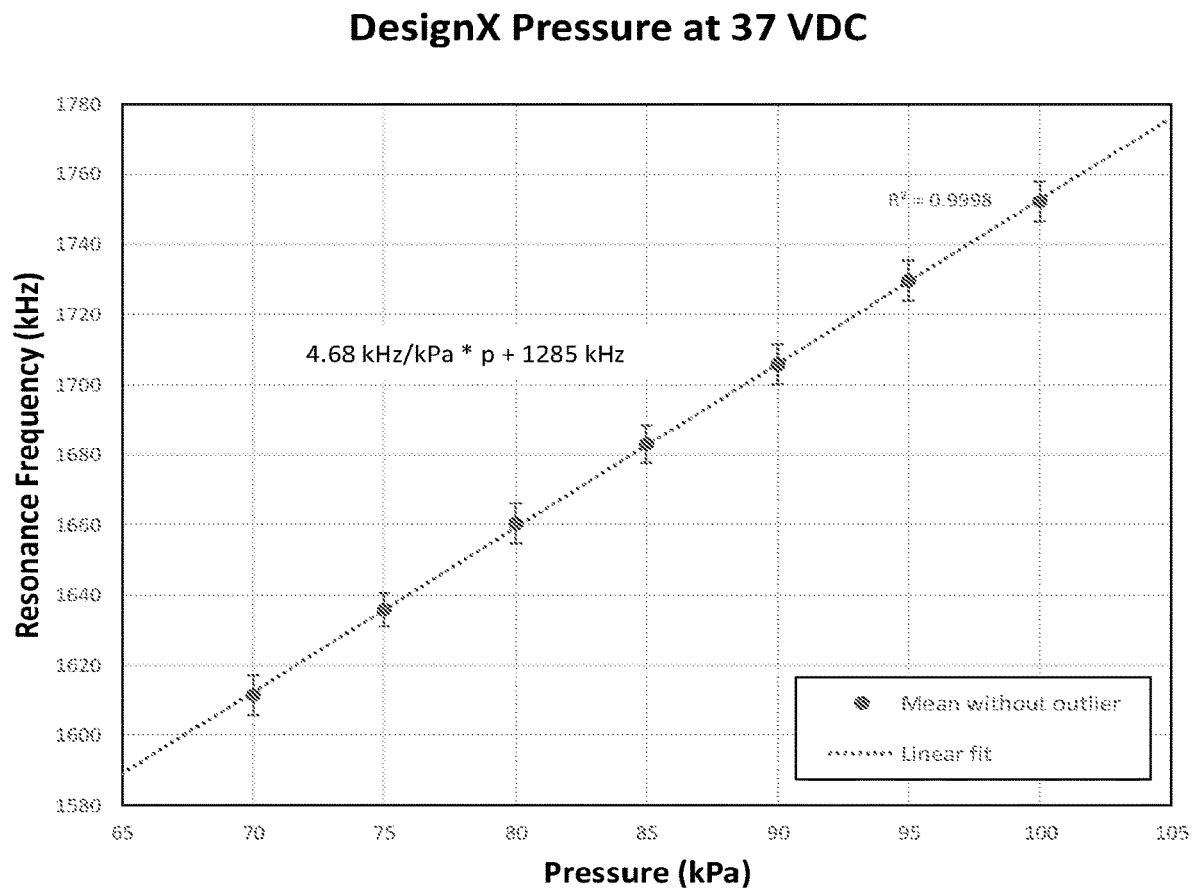
FIG. 2 is a graph showing an example of variability of resonance frequency as a result of variation in environmental air pressure for an example CMUT of the present disclosure.

FIG. 2 shows an example of the variability of resonance frequency as a result of variation in environmental air pressure for an example CMUT of the present disclosure. The graph shown in FIG. 2 has a linear fit with a slope of 4.6 kHz/kPa and an intercept of 1292 kHz. These data may demonstrate a need to determine the resonance frequency at different atmospheric pressures corresponding to different altitudes where humans live.

TABLE 1

Figure 4:
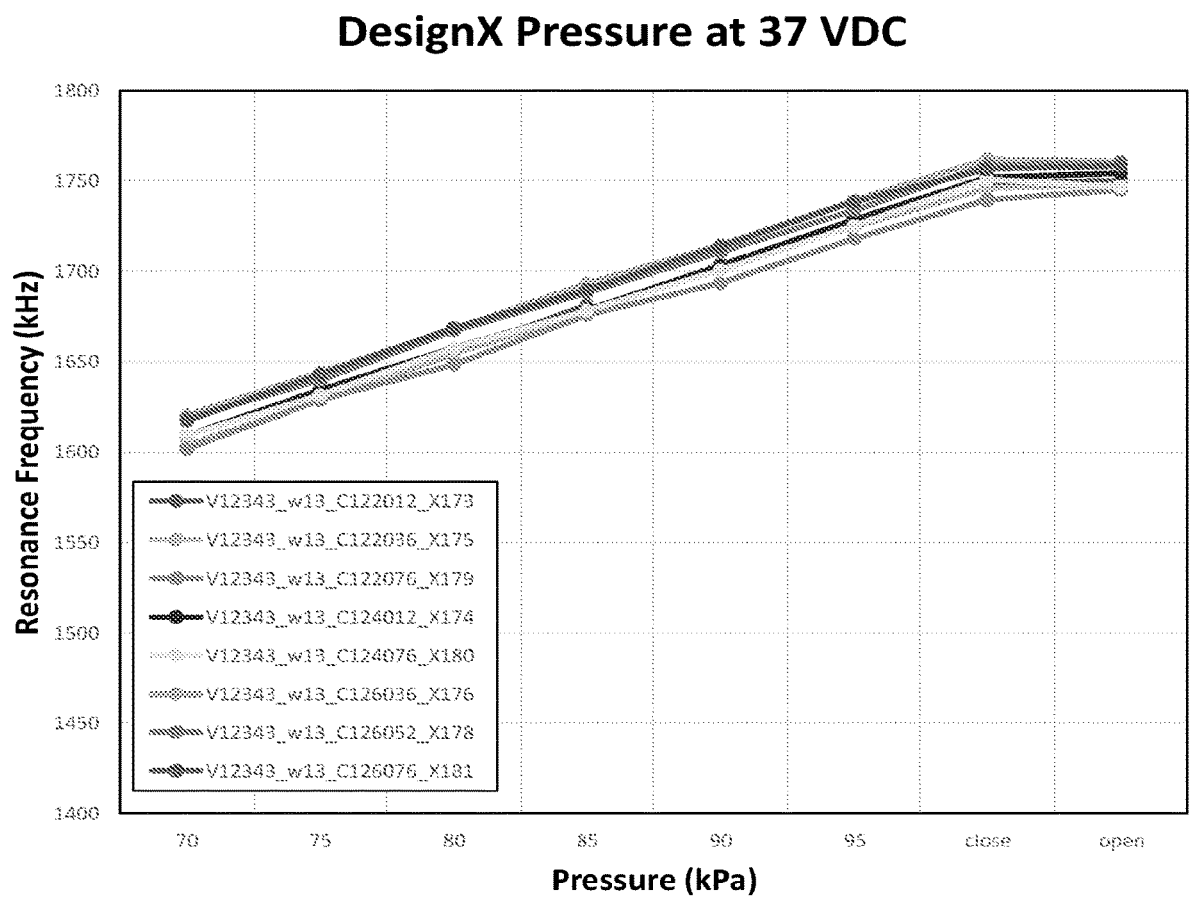
FIG. 4 is a graph showing measurement of the type of FIG. 2 for 5 CMUTs.

Parameters of CMUT components used in the measurements of FIG. 2 and FIG. 4

| Parameter | Symbol | Min | Max | Unit | Measurement Conditions | |
|---|---|---|---|---|---|---|
| Resonance frequency | $f_{res}$ | 1.8 | 1.9 | MHz | Pressure | 1013 ± 40 mbar |
|  |  |  |  |  | Temperature | 27 ± 2° C. |
| Capacity at 10 kHz | C | 2.5 | 10.0 | pF | Relative humidity | <1% |
|  |  |  |  |  | Voltage DC | 0 V (*); 35 V (**) |
| Pull-In voltage | Upi | 43.0 | 48.0 | V | Voltage AC Frequency | 1.0 ± 0.1 V 100.0 kHz (*) |

Figure 3:
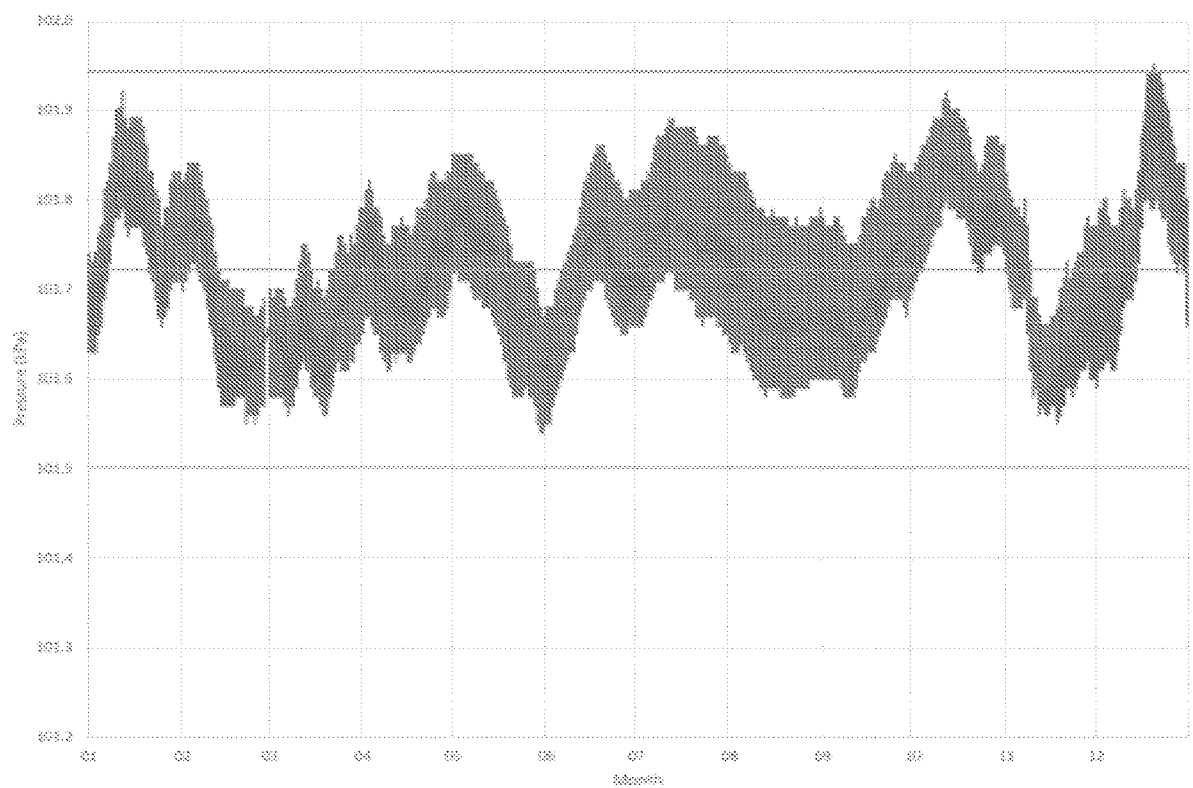
FIG. 3 is a graph showing the variability of atmospheric pressure over the course of a year. It shows a 0.44 kPa variation (3-sigma confidence interval) over the course of one year, at sea level.

FIG. 3 shows variability of atmospheric pressure over the course of a year. FIG. 3 shows a 0.44 kPa variation (3-sigma confidence interval) over the course of one year, at sea level.

Using the fit in FIG. 2, 0.44 kPa of pressure change will change a resonance frequency 0.44 kPa*4.6 kHz/kPa=2.02 kHz, or 0.1% of the original resonance frequency shown in Table 1. Significantly greater pressure variation may be experienced at different altitudes from sea level to 10,000 feet.

FIG. 4 shows a measurement of the variability of CMUT resonance frequency as a result of variation in environment, as seen in FIG. 2, for 5 CMUTs. There is roughly 50 kHz of difference in the resonance frequency among five CMUTs at any particular pressure, and the entire cohort of these CMUTS can be seen displaying dramatic changes in resonance frequency over the entire pressure range.

The variability in resonance demonstrated in FIG. 3 is at least 10 times that of variation at fixed altitude over time seen in FIG. 2 and FIG. 4. While these two sources of variation demonstrate different resonance frequency changes under different circumstances, both demonstrate importance of awareness of immediate resonance frequency of the ultrasound transducer and the need to operate at that frequency to maximize transducer sensitivity. The methods, systems, and devices described elsewhere herein, provide a solution to determining the operating resonance frequency of an ultrasound transducer at a given moment (of the year indicating seasons influencing e.g., humidity and atmospheric pressure) in a given region with varying environment parameters (e.g., altitude and local temperature fluctuation).

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

Although the above steps show each of the methods in accordance with embodiments, a person of ordinary skill in the art will recognize many variations based on the teaching described herein. The steps may be completed in a different order. Steps may be added or omitted. Some of the steps may comprise sub-steps. Many of the steps may be repeated as often as beneficial.

One or more of the steps of each of the methods may be performed with circuitry as described herein, for example, one or more of the processor or logic circuitry such as programmable array logic for a field programmable gate array. The circuitry may be programmed to provide one or more of the steps of each of the methods, and the program may comprise program instructions stored on a computer readable memory or programmed steps of the logic circuitry such as the programmable array logic or the FPGA, for example.

What is claimed is:

1. A method of characterizing an ultrasound transducer, comprising:
   directing a broadband electrical stimulus waveform at an ultrasound transducer, wherein a spectral bandwidth of the broadband electrical stimulus waveform includes an anticipated resonance frequency range of the ultrasound transducer;
   measuring a ringdown characteristic of the ultrasound transducer from at least one emitted signal of the ultrasound transducer as a result of the broadband electrical stimulus waveform; and
   determining a resonance frequency of the ultrasound transducer based at least in part on the ringdown characteristic.

2. The method of claim 1, wherein the ultrasound transducer is coupled to a speculum of an otoscope.

3. The method of claim 1, wherein the ultrasound transducer is coupled to a stethoscope for auscultation of internal organs or blood vessels.

4. The method of claim 1, wherein the ringdown characteristic of the ultrasound transducer is measured by a Doppler receiver configured to amplify the at least one emitted signal of the ultrasound transducer in response to the broadband electrical stimulus waveform.

5. The method of claim 4, further comprising digitizing the at least one emitted signal of the ultrasound transducer.

6. The method of claim 1, wherein measuring the ringdown characteristic of the ultrasound transducer comprises calculating a Fourier transform of the at least one emitted signal from the ultrasound transducer in response to the broadband electrical stimulus waveform.

7. The method of claim 1, wherein the ringdown characteristic comprises a resonance frequency.

8. The method of claim 6, further comprising determining a peak frequency, wherein the peak frequency corresponds to a frequency of a maximum amplitude of the Fourier transform of the at least one emitted signal.

9. The method of claim 6, further comprising determining a peak frequency of a plurality of data points of the Fourier transform, wherein determining a peak frequency comprises:
   (a) receiving the plurality of Fourier transform data points of the at least one emitted signal of the ultrasound transducer;
   (b) determining a polynomial fit of a plurality of data points surrounding the peak frequency of the plurality of Fourier transform data points; and
   (c) determining the peak frequency from a maximum of the polynomial fit of the plurality of data points surrounding the peak frequency.

10. The method of claim 1, wherein the broadband electrical stimulus waveform comprises a pulsed signal.

11. The method of claim 10, wherein the pulsed signal comprises a delta function.

12. The method of claim 10, wherein the pulsed signal comprises one or more oscillations, and wherein the pulsed signal comprises at least 1 cycle of oscillation.

13. The method of claim 12, wherein the pulsed signal comprises a cycle duration, wherein the cycle duration of the pulsed signal is configured to cover an anticipated range of resonance frequencies of the ringdown characteristic.

14. The method of claim 10, wherein the pulsed signal comprises at least one pulse.

15. The method of claim 1, wherein the ringdown characteristic is measured after the broadband electrical stimulus waveform is directed at the ultrasound transducer.

16. The method of claim 1, wherein at least two broadband electric stimulus waveforms are directed to the ultrasound transducer, and wherein at least two emitted signals of the ultrasound transducer are averaged.

17. The method of claim 1, wherein the ringdown characteristic comprises a resonance frequency, wherein the resonance frequency is from 1500 kilohertz (kHz) to about 2000 kHz.

18. The method of claim 1, further comprising characterizing the ultrasound transducer as functional or non-functional based on the ringdown characteristic.

19. The method of claim 18, wherein the non-functional characterization of the ultrasound transducer comprises a ringdown characteristic outside a predetermined range for the ringdown characteristic of the functional ultrasound transducer.

20. A computer system for characterizing an ultrasound transducer, comprising:
    (a) an ultrasound transducer;
    (b) a processor in electrical communication with the ultrasound transducer; and
    (c) a non-transient computer readable storage medium including software, wherein the software comprises executable instructions that, as a result of execution cause the processor of the computer system to:
        (i) provide a broadband electrical stimulus waveform to the ultrasound transducer, wherein a spectral bandwidth of the broadband electrical stimulus waveform comprises an anticipated resonance frequency range of the ultrasound transducer;
        (ii) measure an emitted signal from the ultrasound transducer in response to the broadband electrical stimulus waveform;
        (iii) determine a ringdown characteristic of the emitted signal; and
        (iv) determine a resonance frequency of the ultrasound transducer based at least in part on the ringdown characteristic.

21. The method of claim 1, wherein directing the broadband electrical stimulus waveform at the ultrasound transducer comprises driving the ultrasound transducer with the broadband electrical stimulus waveform.

22. The method of claim 1, wherein directing the broadband electrical stimulus waveform at the ultrasound transducer comprises pinging the ultrasound transducer.

\* \* \* \* \*